United States Patent
Gordon

[11] 3,890,860
[45] June 24, 1975

[54] SILENCER AND SUPPORT MEANS FOR A METAL WORKPIECE DURING MACHINING THEREOF

[75] Inventor: Daniel J. Gordon, 22132 Treadwell, Farmington, Mich. 48024

[73] Assignee: Dayco Corporation, Dayton, Ohio

[22] Filed: May 21, 1973

[21] Appl. No.: 361,933

[52] U.S. Cl. .............................................. 82/38 A
[51] Int. Cl.² ............................................ B23B 25/00
[58] Field of Search .................................. 82/38 A

[56] References Cited
UNITED STATES PATENTS

| | | | |
|---|---|---|---|
| 1,506,108 | 8/1924 | Brophy | 82/38 A X |
| 1,786,876 | 12/1930 | Tessky | 82/38 A X |
| 1,904,329 | 4/1933 | Rich | 82/38 A X |
| 2,512,335 | 6/1950 | Kholos | 82/38 A |
| 2,847,880 | 8/1958 | Neidig | 29/106 |
| 3,541,904 | 11/1970 | Gurtner | 82/38 A |

FOREIGN PATENTS OR APPLICATIONS

| | | | |
|---|---|---|---|
| 563,397 | 8/1944 | United Kingdom | 82/38 A |
| 440,105 | 8/1948 | Italy | 82/38 A |

Primary Examiner—Harrison L. Hinson
Attorney, Agent, or Firm—Reuben Wolk

[57] ABSTRACT

A device for silencing and supporting a metal workpiece during the machining thereof which employs a sound insulating material which serves to absorb and trap sound as well as absorb vibrations of the workpiece.

2 Claims, 18 Drawing Figures

PATENTED JUN 24 1975　　3,890,860

SHEET 1

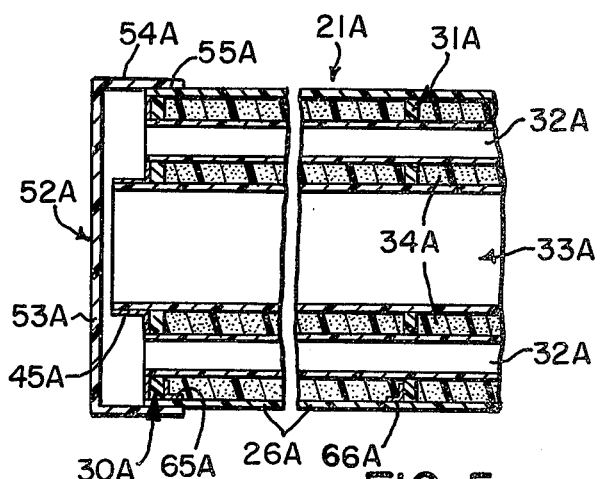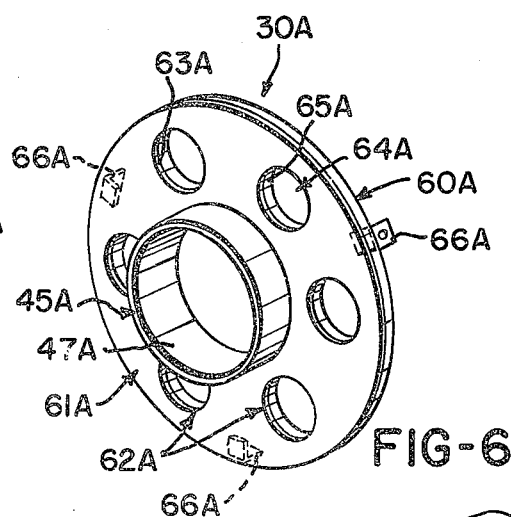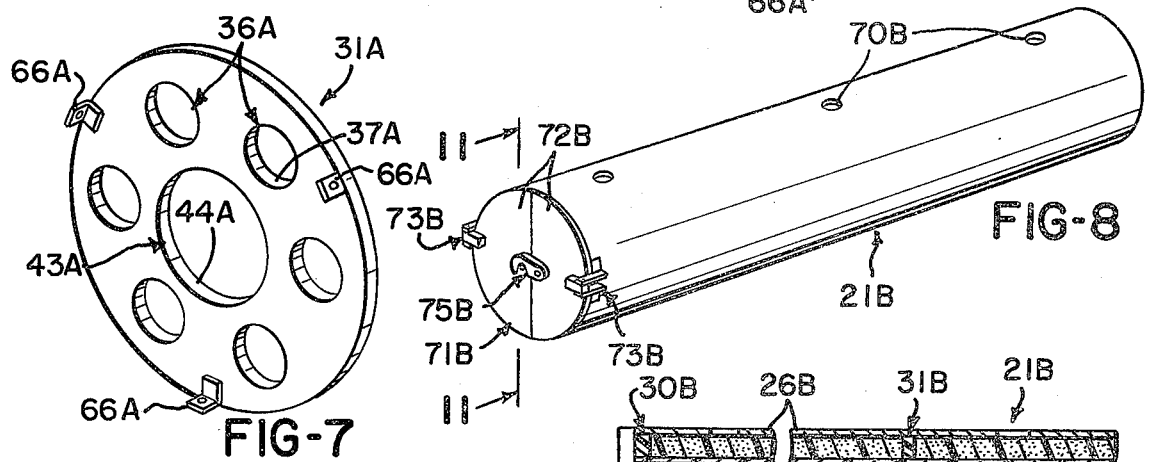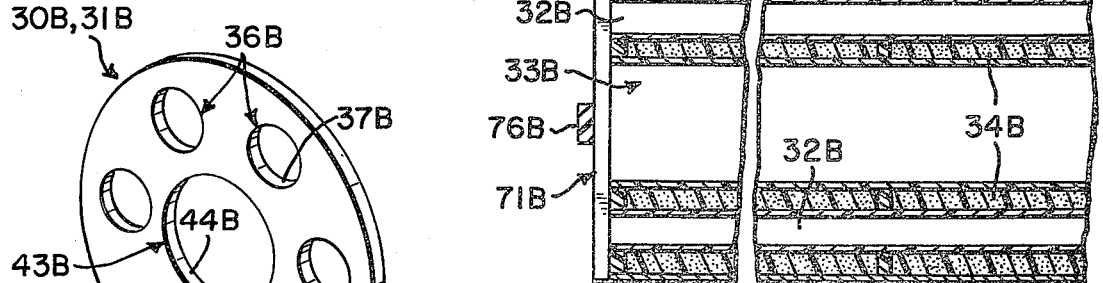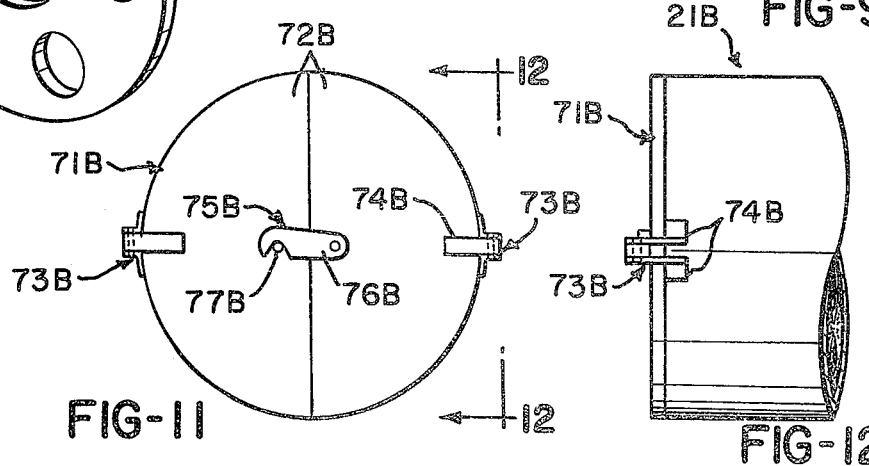

SILENCER AND SUPPORT MEANS FOR A METAL WORKPIECE DURING MACHINING THEREOF

BACKGROUND OF THE INVENTION

Noise pollution is a problem which is of concern to the public in general; however, in the manufacturing industry it is necessary to keep manufacturing noise levels at a minimum for the benefit not only of manufacturing machine operators but also for the benefit of personnel in the vicinity of the manufacturing machines.

In particular, it is well known that prolonged exposure of the unprotected human ear to noise levels greater than 90 decibels will result in serious injury to such ear. It has also been found that the maximum permissible exposure to noise levels in excess of 90 decibels decreases as the noise level increases whereby exposure at noise levels in excess of 115 decibels may cause injury to an unprotected ear in a few seconds.

During the machining of metal workpieces such as elongated bar stock it has been found that considerable, and often ear-injurious, noise is generated and the noise and vibrations are usually greater with bar stock having a noncircular cross-sectional configuration, such as polygonal. Therefore, it is apparent that there is a need to provide suitable means for silencing and supporting a metal workpiece during the machining thereof.

Various devices have been proposed heretofore in an effort to reduce noise levels during the machining of metal workpieces; however, in general, such devices either deteriorate physically and produce particles which interfere with efficient machining operations, are too expensive for economical production, or require excessive attention by operators.

SUMMARY

This invention provides a silencer and support means for a metal workpiece during the machining thereof which is of simple and economical construction, employs a sound insulating material which serves to absorb sound as well as absorb vibrations of the workpiece, has a comparatively long service life, and may be used with minimum operator attention.

Other details, uses, and advantages of this invention will be readily apparent from the embodiments thereof presented in the following specification, claims and drawings.

BRIEF DESCRIPTION OF THE DRAWINGS

The accompanying drawings show present preferred embodiments of this invention, in which

FIG. 5 is a view similar to the left end portion of FIG. 2 illustrating another exemplary embodiment of the device of this invention;

FIG. 6 is a perspective view of a typical end supporting spacer comprising the device of FIG. 5;

FIG. 7 is a perspective view illustrating a typical intermediate supporting spacer comprising in the device of FIG. 5;

FIG. 8 is a perspective view illustrating another exemplary embodiment of the device of this invention;

FIG. 9 is a view similar to FIG. 5 illustrating the left end portion of the device of FIG. 8;

FIG. 10 is a perspective view of a typical supporting spacer utilized in the device of FIG. 8 at its opposite ends as well as intermediate such opposite ends;

FIG. 11 is an enlarged view taken on the line 11—11 of FIG. 8 illustrating an end cap used on the device of FIG. 8;

FIG. 12 is a view taken essentially on the line 12—12 of FIG. 11;

DESCRIPTION OF ILLUSTRATED EMBODIMENTS

Figure 1:
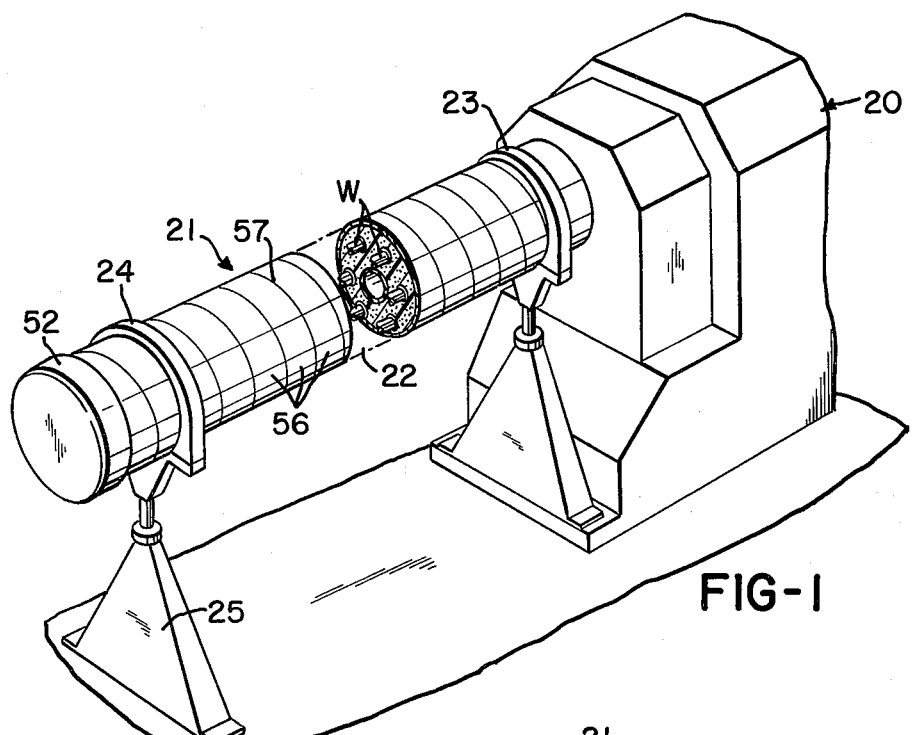
FIG. 1 is a perspective view with parts in cross section and parts broken away illustrating one exemplary embodiment of a device of this invention utilized with an associated machine.

Reference is now made to FIG. 1 of the drawings which illustrates an exemplary machine 20 which utilizes one exemplary embodiment of an apparatus or device of this invention which is designated generally by the reference numeral 21 and the device 21 is used for silencing and supporting a plurality of six elongated metal workpieces W, each of circular cross-sectional outline, during the machining thereof with the workpieces W being shown by breaking away a portion of such device as illustrated at 22. The machine 20 of this example automatically machines or cuts screw threads in each workpiece W in a manner well known in the art; and, a detailed description of the operation of the machine 20 will not be necessary for an understanding of this invention.

The device 21 is supported adjacent its inner end by a suitable support structure 23 carried by the machine 20; and, the outer end portion of the device 21 is supported by an apparatus 24 which is carried on a supporting column 25.

Figure 2:
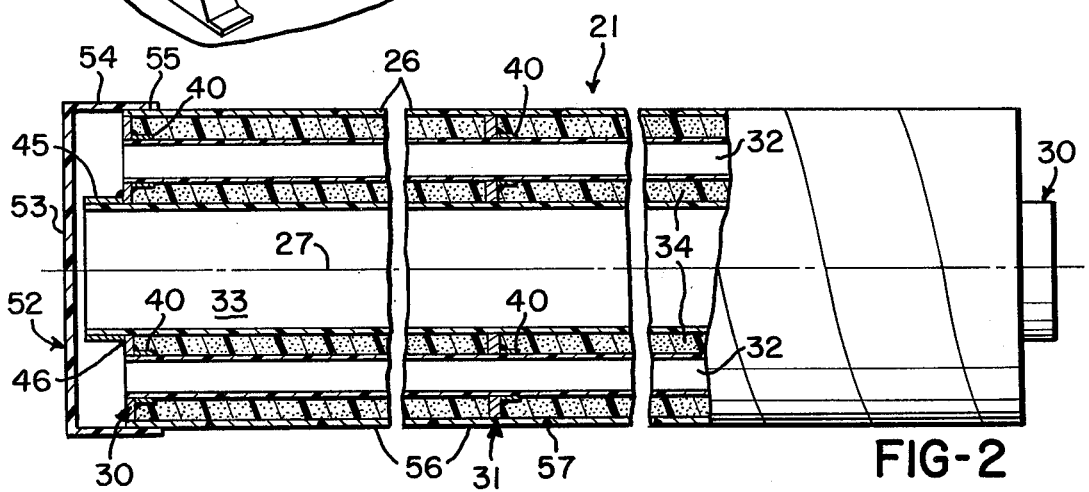
FIG. 2 is a view of the device of FIG. 1, minus the metal workpieces, drawn to an enlarged scale and illustrating parts in cross section, parts in elevation, and parts broken away.

As seen particularly in FIG. 2, the device 21 comprises an outer housing 26 which has a longitudinal axis 27 which defines the longitudinal axis of the entire device 21. The device 21 has a plurality of supporting spacers or supports comprised of end supporting spacers each designated by the same reference numeral 30 and supporting spacers arranged between or intermediate the end spacers with each intermediate spacer being designated by the same reference numeral 31.

The spacers 30 and 31 are arranged in spaced relation within the housing 26 and along the axis 27 and the spacers 30 and 31 support a plurality of tubular members each designated by the same reference numeral 32. Each tubular member 32 is adapted to receive an associated workpiece or elongated member of metal bar stock W therewithin. The spacers 30 and 31 also support an inner tubular housing 33 which comprises the device 21 and is arranged concentrically within the outer housing 26. The housing 33 and tubular members 32 are preferably suitably fixed to the end supporting spacers 30 using any suitable technique including adhesive bonding, welding, mechanical fastening techniques, or the like; and, may be similarly fixed to the intermediate supporting spacers 31.

The device 21 has a sound insulating material which in this example is shown in the form of a flexible foam product 34, such as urethane foam. The flexible foam product or sound insulating material 34 fills the entire volume between the inner housing 33 and the outer housing 26 while substantially completely surrounding each of the tubular members 32, and the material 34 serves to absorb and trap sound, i.e., sound waves, as well as absorb vibrations of each workpiece W during the machining thereof.

Figure 3:
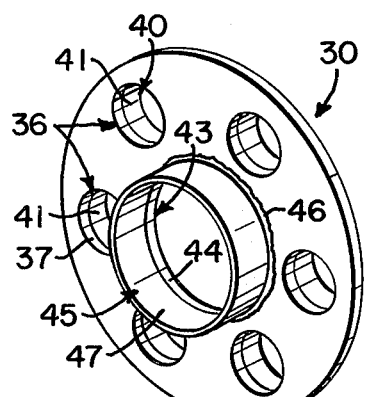
FIG. 3 is a perspective view of a typical end supporting spacer comprising the device of FIG. 2.
Figure 4:
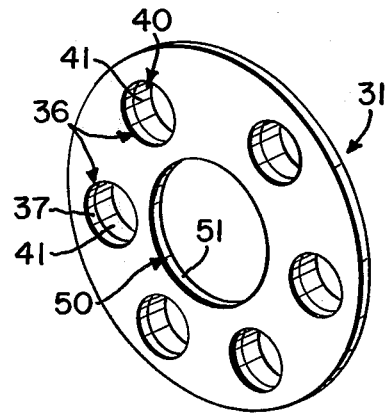
FIG. 4 is a perspective view of a typical intermediate supporting spacer comprising the device of FIG. 2.

Each supporting spacer 30 and 31, see FIGS. 3 and 4 respectively, is made of a suitable metal and has a plurality of cylindrical openings therein each designated by the same reference numeral 36 and each defining a cylindrical supporting surface 37. Each spacer 30 and 31 also has a tubular flange 40 which is suitably fixed as by a weld adjacent each opening 36 and each flange 40 has an inside cylindrical supporting surface 41 which cooperates with an associated cylindrical supporting surface 37 to provide better support for an associated tubular member 32.

In this example, each supporting spacer 30 and 31 has a plurality of six cylindrical openings 36 defining corresponding cylindrical surfaces 37 and six tubular flanges 40 each associating with an associated cylindrical opening 36 whereby the device 21 is adapted to support a plurality of six elongated metal workpieces W for machining thereof by the machine 20. The diameters of the cylindrical surfaces 37 and 41 are substantially equal and closely correlated with the outside diameters of the tubular members 32 to be extended therethrough to enable easy assembly of device 21 yet with sufficiently tight clearances to provide optimum structural integrity.

Each end supporting spacer 30 has a comparatively large central opening 43 therein defining a central cylindrical surface 44 and a comparatively large tubular flange 45 is fixed by a weld 46 to the spacer 30 adjacent the opening 43. The flange 45 has an inside cylindrical surface 47 and the cylindrical surfaces 44 and 47 cooperate to support an associated end portion of the inner tubular housing 33.

Each intermediate supporting spacer 31 has an opening 50 therein defining a cylindrical surface 51. The cylindrical surface 51 is adapted to support the outside surface of inner tubular housing 33.

The device 21 may have its tubular members 32 supported therein in any suitable arrangement; and, in this example the tubular members 32 are supported in a circular pattern with the centers of members 32 being arranged on the circumference of a common circle and in equally spaced apart relation. The inner tubular housing 33 is concentric with the outer housing 26 and tubular member 33 defines a longitudinal cylindrical opening through the device 21.

To help in the further reduction of machining noises the device 21 employs an end cap 52 which is installed after the device 21 is suitably supported in position relative to the machine 20 and after a plurality of elongated metal workpieces or metal rods of bar stock W have been inserted within the device 21. The end cap 52 is made of a suitable elastomeric material and has a circular planar end wall 53 adjoined by a right circular cylindrical side wall 54 which has an inside surface which is held by frictional engagement against the terminal outer end portion 55 of the device 21 to hold the end cap 52 into position. The end cap 52 is easily installed on and removed from end portion 55.

The outer tubular housing 26 of the device 21 may be made of any suitable material and in this example such housing is made of an elongated strip of metal, such as steel, which is wound in a helical pattern to define a plurality of adjoining turns 56 along the length of the device 21 and each pair of adjoining turns 56 are suitably fixed together by a butt weld 57 whereby the housing 26 has a substantially uniform thickness throughout its length defined by the thickness of the helically wound metal strip.

As previously mentioned, the spacers 30 and 31 of device 21 are made of metallic material and the inner tubular housing 33 of the device 21 is made of a comparatively rigid plastic material such as polyvinyl chloride while the tubular members 32 are preferably made of an ultra high molecular weight plastic material such as polyethylene.

Other exemplary embodiments of this invention are illustrated in FIGS. 5–7 and 8–10. The devices illustrated in FIGS. 5–7 and 8–10 are similar to the device 21; therefore, such devices will be designated by the reference numerals 21A and 21B respectively and representative parts of each device which are similar to corresponding parts of the device 21 will be designated in the drawings by the same reference numeral as in the device 21 (whether or not such parts are mentioned in the specification) followed by an associated letter designation either A or B and not described again in detail. Only those component parts which are substantially different from corresponding parts of the device 21 will be designated by a new reference numeral also followed by the associated letter designation and described in detail.

The device 21A illustrated in FIG. 5 utilizes end supporting spacers 30A and intermediate supporting spacers 31A, to be described subsequently, which are made primarily of plastic materials while the tubular members 32A are also made of a suitable ultra high molecular weight plastic material such as polyethylene. The outer housing 26A is in the form of a single piece tubular cylinder made of a suitable comparatively rigid plastic material and the inner tubular member 33A is also made of a rigid plastic material such as polyvinyl chloride. The end cap 52A is substantially identical to the end cap 52.

Each end supporting spacer 30A is a double-thickness spacer comprised of two main portions 60A and 61A made of plastic and metal respectively which are fixed together in any suitable manner known in the art. The metal portion 61A has a plurality of openings 62A therein each defining a cylindrical supporting surface 63A and the plastic portion 60A has a plurality of openings 64A therein each defining a cylindrical supporting surface 65A. Each cylindrical supporting surface 63A is arranged in aligned relation with an associated cylindrical supporting surface 65A to provide a larger supporting surface for each member 32A supported on a cooperating set of surfaces 63A and 65A.

The metal portion 61A also has a comparatively large tubular flange 45A which has a cylindrical inside supporting surface 47A which supports an associated end portion of tubular member 33A.

In some applications of this invention, a plurality of L-shaped tabs or flanges 66A may also be suitably fixed to each end spacer 30A and the inside surface of the plastic housing 26A to help hold the end spacers 30A and housing 26A together in a high-strength manner. Three flanges 66A are used with each end spacer 30A and such flanges are spaced 120 degrees apart.

Each intermediate supporting spacer 31A of device 21A is a single thickness annular spacer which is made of a suitable rigid plastic material and has a plurality of cylindrical openings 36A therein each defining a cylindrical supporting surface 37A for supporting an associated member 32A. Each spacer 31A also has a central opening 43A therein defining an associated cylindrical supporting surface 44A which supports an associated end portion of the inner tubular plastic housing 33A. Each spacer 31A may also use three equally spaced apart flanges 66A.

The members 26A, 30A, 31A, 32A, and 33A may be suitably fixed together using any suitable technique or means known in the art. Further, it will be appreciated that a sound insulating material such as flexible foam product 34A also surrounds each tubular member 32A and substantially completely fills the volume between members 33a and 26A.

The device 21B illustrated in FIGS. 8–10 utilizes a plurality of end spacers 30B and intermediate spacers 31B which are all made of a suitable rigid plastic and are all substantially identical and are also substantially identical to the spacers 31A of the device 21A. The inner tubular housing 33B and tubular members 32B of device 21B are each also made of a suitable plastic material while the outer housing 26B is preferably made of a suitable metallic material such as steel, or the like.

The outer metal housing 26B has a plurality of spaced openings each designated by the same reference numeral 70B which extend through its wall and are particularly adapted to enable introduction of the sound insulating material or flexible foam product 34B therethrough. For example, such foam product may be in the form of a flowable composition which is poured through the openings 70B by gravity and allowed to expand and set in the usual manner to completely fill the volume between the inner tubular housing 33B and outer housing 26B while surrounding each of the tubular members 32B.

The device 21B may employ an end cap, as a silencing boot, which is similar to the end cap 52 of the device 21; however, device 21B preferably uses an end cap 71B which is permanently attached to the device 21B, see FIGS. 11 and 12. The end cap 71B is comprised of a pair of semicircular discs 72B each of which is suitably hingedly fastened to the device 21B and in particular to the metal housing 26B thereof by a hinge means or hinge 73B. Each hinge 73B is suitably fixed to its associated disc 72B and to the housing 26B as illustrated at 74B. Each hinge 73B allows its disc 72B to be moved in a hinged manner away from the end of device 21B to allow introduction of the workpieces W within device 21B. The end cap 71B also has latch means 75B comprised of a latch member 76B pivotally fastened to one of the discs 72B and a pin 77B suitably fixed to the other disc 72B with the latch member 76B having a hooking end portion which hooks around the pin 77B in a known manner to provide a latch for the end cap 71B.

Figures 13, 14:
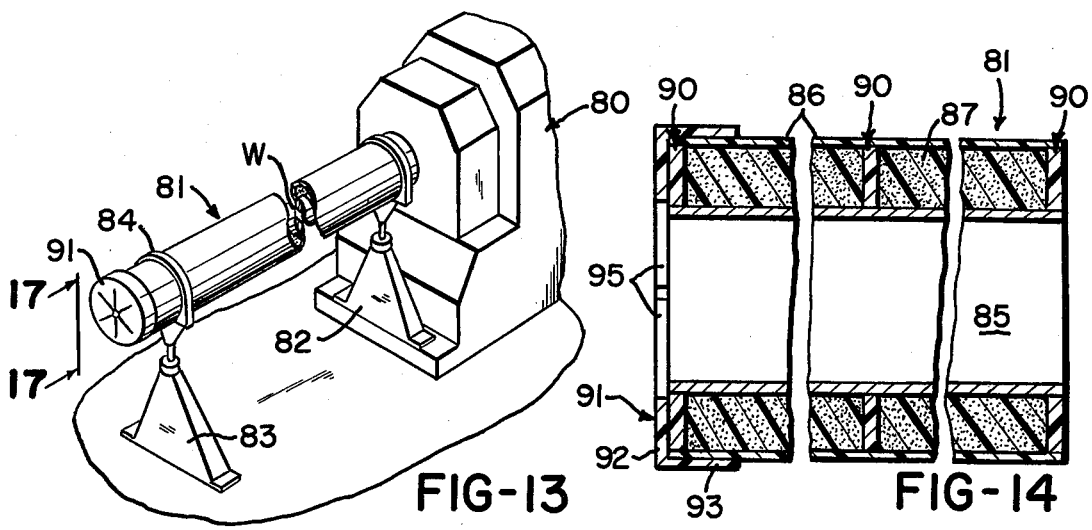
FIG. 13 is a perspective view similar to FIG. 1 illustrating another exemplary embodiment of the device of this invention which is used with a single elongated metal workpiece.
FIG. 14 is an enlarged fragmentary cross-sectional view of the device of FIG. 13 with its elongated workpiece removed.

Reference is now made to FIG. 13 of the drawings which illustrates another exemplary machine 80 also in the form of a machine for automatically cutting screw threads in a workpiece and the machine 80 utilizes another exemplary device of this invention which is designated generally by the reference numeral 81. The device 81 is particularly adapted to support a single workpiece W and serves as a silencer and support for such workpiece during the machining thereof. The machine 80 has a suitable support 82 for supporting the inner end portion of the device 81 and a columnar support 83 for supporting the outer end portion thereof and the support 83 has a strap 84 which is wrapped around the outer end portion of the device 81 and suitably detachably fixed to the support 83.

As seen particularly in FIG. 14 the device 81 comprises an inner tubular member 85 which is made of metal, an outer tubular member 86 made of a suitable plastic material such as a polyester, and a sound insulating material in the form of flexible foam product 87, such as urethane foam arranged between the tubular members 85 and 86. The flexible foam product 87 is substantially identical to the foam product 34 of the device 21 and serves to absorb and trap sound as well as absorb vibrations in the bar stock or workpiece W during the machining thereof. The device 81 may be provided with suitable spacers 90 at its opposite ends and intermediate the opposite ends to hold the tubular members 85 and 86 concentric and in the desired spaced relation with each other and it will be appreciated that the members 85, 86, and 90 are fixed together in any suitable manner.

Figures 15, 16:
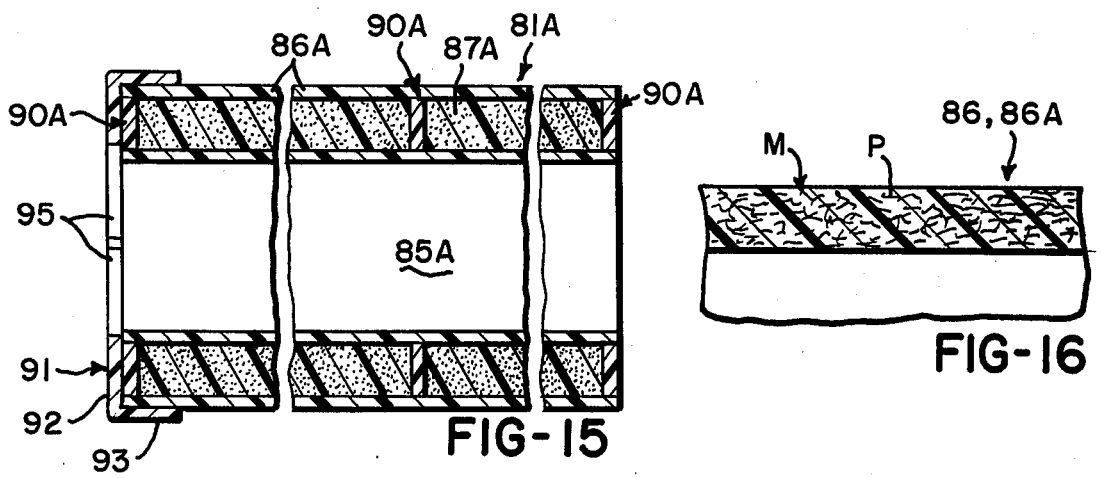
FIG. 15 is a view similar to FIG. 14 illustrating another exemplary embodiment of a device similar to the device of FIG. 14 which may be used interchangeably therewith.
FIG. 16 is an enlarged fragmentary cross-sectional view illustrating a typical outer tubular member which may be used on either the device of FIG. 14 or FIG. 15.

Another exemplary embodiment of a device for supporting a single workpiece is illustrated in FIG. 15 and such device is designated generally by the reference numeral 81A and comprises an inner tubular member 85A made of an ultra high molecular weight plastic material such as polyethelene and an outer tubular member 86A made of plastic material such as polyester. The device 81A has spacers 90A which are similar to the spacers 90 of the device 81 and has a suitable sound insulating material in the form of a flexible product such as urethane 87A provided between its tubular members 85A and 86A and fills the entire volume therebetween. The flexible product 87A is provided for the same purpose as the foam product 87 and serves to absorb and trap sound, i.e., sound waves, produced during machining of the workpiece W and also absorbs vibrations of such workpiece.

As previously indicated the outer tubular member 86 of the device 81 and member 86A of the device 81A are preferably made of a suitable plastic material which is sufficiently rigid to prevent sagging of the associated device because it has been found that sagging causes greater noise to be generated; and, any suitable plastic may be used for this purpose. However, excellent results have been obtained by making the outer member 86 or 86A of a polyester matrix M, see FIG. 16, which has been suitably reinforced with particles P of fiberglass which are embedded in such matrix and the fiberglass particles P are dispersed through the matrix M in a random manner.

Figures 17, 18:
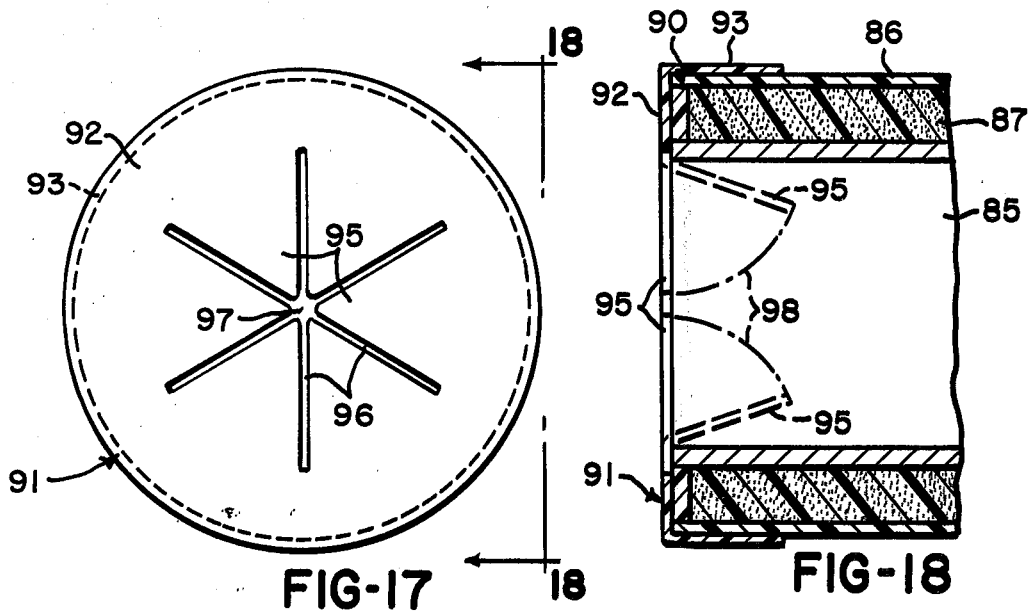
FIG. 17 is an enlarged view taken essentially on the line 17—17 of FIG. 13 of an end cap used on the device of FIG. 14 as a silencing boot.
FIG. 18 is an enlarged view taken essentially on the line 18—18 of FIG. 17.

The device 81A may be used interchangeably with the device 81 on the machine 80 and to help keep noise levels at a minimum an end cap 91 is provided which may be used on either the device 81 or the device 81A and such end cap 91 may be considered a silencing boot, see FIGS. 13, 17, and 18.

The end cap 91 has a planar end wall 92 and a right circular cylindrical wall 93, and the cylindrical wall 93 adjoins the peripheral edge of the end wall 92 and is defined as an integral part of the end wall 92 whereby the walls 92 and 93 are defined as a single piece construction. The cylindrical wall 93 is adapted to frictionally hold the end cap 91 concentrically around an outer end portion of either the device 81 or 81A.

The end wall 92 has a plurality of integral flaps 95 which are foldable transverse their normal positions and such flaps are normally coplanar with the remainder of the end wall 92. The flaps 95 allow movement therethrough of the workpiece W and during such movement bend out of their plane as shown by dotted lines at 98 in FIG. 17. The end cap 91 is preferably made of a suitable elastomeric material and it can be seen that the flaps 95 are defined by a plurality of slits each designated by the same reference numeral 96 which extend radially from the center 97 of the end wall in a substantially symmetrical pattern. In this example six slits 96 are provided defining six substantially triangular foldable flaps and the end wall 92 and adjoining cylindrical wall 93 have substantially the same thickness throughout.

Each device 21, 21A, and 21B has an end cap at its outer end which serves as a common end cap or silencing boot for the plurality of six workpiece-supporting tubular members arranged within the outer housing of each of such devices. However, it will be appreciated that if desired the devices 21, 21A and 21B may be suitably modified so that each of their tubular members 32, 32A, and 32B extends outwardly of the end supporting spacer whereupon instead of using a single end cap as a silencing boot, an end cap, such as 91, may be provided individually on each workpiece-supporting tubular member.

In this disclosure of the invention the machines 20 and 80 have been described as machines for making or cutting screw threads in an automatic manner. However, it will be appreciated that each device of this invention may be used as a silencer and support for an associated elongated workpiece which is being machined in any suitable manner known in the art and such machining is defined as cutting away or otherwise forming of metal by any suitable cutting instrument or tool which causes noise and vibration as it works or machines the workpiece W. Such a tool or instrument includes, among others, grinding tools, saws, cutters of all types, etc.

In this disclosure of the invention reference has been made to the utilization of a sound insulating material in the form of a flexible foam product and such foam product is designated by the reference numerals 34, 34A, 34B, 87, and 87A. Further, although flexible urethane foam has been mentioned it will be appreciated that any suitable flexible foam product may be used for this purpose although a flexible foam product made of an elastomeric material is preferred.

In this disclosure of the invention each workpiece W has been illustrated in the drawings as having a circular cross-sectional configuration; however, it is to be understood that elongated metal workpieces having noncircular cross-sectional configurations may be machined as is common in the art and it has been shown that such noncircular workpieces generate more noise whereupon the improved device of this invention is even more effective with such noisier workpieces.

The inside diameter of each workpiece-supporting tubular member comprising each device 21, 21A, 21B, 81, and 81A may be controlled so as to receive a particular size workpiece; however, it will be appreciated that such inside diameter may be selected so as to receive workpieces of different sizes within a predetermined range.

Each workpiece-supporting member may be made of metal as previously mentioned and any suitable metal used in the art may be used. Further, each workpiece-supporting member may be made of an ultra high molecular weight plastic material and it has been found that polyethylene provides the best results; however, other plastic materials such as polypropylene may be used for this purpose.

While present exemplary embodiments of this invention, and methods of practicing the same, have been illustrated and described, it will be recognized that this invention may be otherwise variously embodied and practiced within the scope of the following claims.

I claim:

1. A device for silencing and supporting a metal workpiece during the machining thereof comprising an inner tubular member; an outer tubular member; a flexible foam product made of an elastomeric material and provided in the space between said tubular members, said flexible foam product filling the entire volume between said tubular members and serving to absorb and trap sound as well as absorb vibrations of said workpiece; and an end cap fastened to an end portion of said device and serving as a silencing boot, said end cap having a planar end wall adjoined by a cylindrical wall which frictionally engages an outer end portion of said outer tubular member to detachably fasten said end cap to said device, said end cap being made of an elastomeric material and having a plurality of integral flaps defined in said end wall, said flaps being normally arranged coplanar with each other and being foldable transverse their associated plane to allow movement of said workpiece axially through said inner tubular member.

2. A device as set forth in claim 1 in which said flaps are defined by a plurality of slits in said end wall which extend radially from the center thereof.

* * * * *